United States Patent
Tandri et al.

(10) Patent No.: US 11,134,074 B1
(45) Date of Patent: Sep. 28, 2021

(54) SYSTEMS AND METHODS FOR SECURE HTTP CONNECTIONS USING A DISTRIBUTED CERTIFICATE VALIDATION MODEL

(71) Applicant: FMR LLC, Boston, MA (US)

(72) Inventors: Sudarsan Tandri, Boston, MA (US); Gregory Smith, Boston, MA (US); Gunjan Piya, Boston, MA (US)

(73) Assignee: FMR LLC, Boston, MA (US)

( * ) Notice: Subject to any disclaimer, the term of this patent is extended or adjusted under 35 U.S.C. 154(b) by 0 days.

(21) Appl. No.: 16/881,543

(22) Filed: May 22, 2020

(51) Int. Cl.
   *G06F 15/16* (2006.01)
   *H04L 29/06* (2006.01)
   *H04L 29/08* (2006.01)

(52) U.S. Cl.
   CPC ........ *H04L 63/0823* (2013.01); *H04L 63/166* (2013.01); *H04L 67/02* (2013.01)

(58) Field of Classification Search
   CPC .... H04L 63/0823; H04L 63/166; H04L 67/02
   USPC .......................................................... 726/5
   See application file for complete search history.

(56) References Cited

U.S. PATENT DOCUMENTS

| | | | | |
|---|---|---|---|---|
| 6,748,528 B1 * | 6/2004 | Greenfield | .......... | H04L 63/0823 713/151 |
| 8,001,599 B2 * | 8/2011 | McBrearty | .............. | H04L 63/20 726/22 |
| 8,214,638 B1 * | 7/2012 | Karp | ...................... | H04L 9/0825 713/157 |
| 8,249,255 B2 * | 8/2012 | Gluck | ..................... | H04L 63/08 380/255 |
| 8,713,644 B2 * | 4/2014 | Krishna | ................ | H04L 63/126 726/4 |
| 9,413,727 B2 * | 8/2016 | Ardeli | ................. | H04L 63/0281 |
| 10,142,297 B2 * | 11/2018 | Lin | ........................... | H04L 9/14 |
| 2009/0086977 A1 * | 4/2009 | Berggren | .............. | H04L 9/0819 380/279 |
| 2010/0017878 A1 * | 1/2010 | McBrearty | ............. | G06F 21/51 726/22 |
| 2011/0320818 A1 * | 12/2011 | Krishna | .................. | G06F 21/34 713/175 |
| 2013/0191639 A1 * | 7/2013 | Gluck | ..................... | H04L 63/08 713/171 |
| 2016/0057133 A1 | 2/2016 | Ashley et al. | | |

(Continued)

*Primary Examiner* — Moustafa M Meky
(74) *Attorney, Agent, or Firm* — Proskauer Rose LLP

(57) ABSTRACT

Systems and methods for establishing a secure connection between a client computing device and a server hosted website. The method includes requesting an HTTPS connection with a server hosted website. The method further includes receiving a certificate from the server hosted website. The certificate is signed by a certificate authority and certificate validators. The method also includes delivering the certificate to each of the certificate validators. The method further includes receiving a certificate status for each of the certificate validators. Each certificate status indicates whether the certificate is valid or has been revoked. The method also includes determining a quantity of valid certificate statuses received from the certificate validators. The method further includes establishing the HTTPS connection with the server hosted website in response to determining that the quantity of valid certificate statuses meets or exceeds an assurance quantity threshold or a Transmission Layer Security Level of Assurance ("TLS-LoA").

20 Claims, 6 Drawing Sheets

(56) References Cited

U.S. PATENT DOCUMENTS

| | | |
|---|---|---|
| 2016/0119288 A1* | 4/2016 | Ardeli .................. H04L 63/0227 726/12 |
| 2016/0134646 A1* | 5/2016 | Wing .................... H04L 63/166 726/23 |
| 2018/0062995 A1 | 3/2018 | Naar |
| 2018/0212953 A1 | 7/2018 | Khandelwal et al. |
| 2019/0014088 A1 | 1/2019 | Subramaniyan et al. |
| 2019/0074982 A1 | 3/2019 | Hughes |

* cited by examiner

SYSTEMS AND METHODS FOR SECURE HTTP CONNECTIONS USING A DISTRIBUTED CERTIFICATE VALIDATION MODEL

FIELD OF THE INVENTION

The present invention relates generally to systems and methods for establishing secure online connections, including systems and methods for establishing secure connections between a client device and a website.

BACKGROUND OF THE INVENTION

Transport Layer Security ("TLS") and Secure Socket Layer ("SSL") are cryptographic protocols designed to provide communications security over a computer network. TLS/SSL certificates issued by Certificate Authorities ("CAs") play a critical role in enabling HTTPS connections between a client device and a website hosted on a server. Client devices use browsers to perform a "handshake" with the server hosted website before establishing a connection. Generally, browsers have CA certificates pre-installed in order to perform handshakes.

For example, browsers trust the website's security if their digital signature can be verified with one of the pre-installed CA certificates. The browser relies on trusting CAs and their ability to accurately issue proper certificates to the rightful owners of a website. However, rouge CAs can issue technically valid certificates (either as a result of hacking, negligence or misuse) to unauthorized parties. This creates a serious security lapse since a malicious website can trick the browser into labeling this connection as secure by utilizing these fraudulently obtained certificate. Therefore, there is a need for improving browser security, which currently relies on a single point of failure within traditional trust chain models.

SUMMARY OF THE INVENTION

Accordingly, an object of the invention is to provide systems and methods for establishing a secure connection between a client computing device and a server hosted website. It is an object of the invention to provide systems and methods for establishing a secure connection between a client computing device and a server hosted website using a distributed certificate validation model. It is an object of the invention to provide systems and methods for preventing connections between a client computing device and a malicious website masquerading as the owner of the site.

In some aspects, a method for establishing a secure connection between a client computing device and a server hosted website includes requesting, by the client computing device, an HTTPS connection with the server hosted website. The method further includes receiving, by the client computing device, a certificate from the server hosted website. The certificate being signed by a certificate authority and certificate validators. The method also includes delivering, by the client computing device, the certificate to each of the certificate validators. Further, the method includes, for each of the certificate validators, receiving, by the server hosted website, a certificate status which indicates whether the certificate is valid or has been revoked. The method also includes determining, by the server hosted website, a quantity of valid certificate statuses received from the certificate validators. The method further includes, in response to determining that the quantity of valid certificate statuses meets or exceeds an assurance quantity threshold, establishing, by the client computing device, the HTTPS connection with the server hosted website.

In some embodiments, the certificate authority is configured to sign the certificate with a private key. For example, in some embodiments, the certificate authority is configured to deliver the signed certificate to the server hosted website.

In some embodiments, each of the certificate validators is configured to receive the certificate from the certificate authority. For example, in some embodiments, each of the certificate validators is configured to sign the certificate with a private key. In some embodiments, each of the certificate validators is configured to deliver the signed certificate to the server hosted website.

In some embodiments, the assurance quantity threshold comprises two or more valid certificate statuses. In other embodiments, the assurance quantity threshold is based on a desired security level of the server hosted website.

In some aspects, a system for establishing a secure connection between a client computing device and a server hosted website includes a client computing device communicatively coupled to a certificate authority and certificate validators. The client computing device is configured to request an HTTPS connection with the server hosted website. The client computing device is also configured to receive a certificate from the server hosted website. The certificate being signed by the certificate authority and the certificate validators. Further, the client computing device is configured to validate the certificate from each of the certificate validators using a pre-installed root CA certificate. The client computing device is also configured to, for each of the certificate validators, determine a certificate status which indicates whether the certificate is valid or has been revoked. Further, the client computing device is configured to determine a quantity of valid certificate statuses validated from the certificate validators. The client computing device is also configured to, in response to determining that the quantity of valid certificate statuses meets or exceeds an assurance quantity threshold, establish the HTTPS connection with the server hosted website.

In some embodiments, the certificate authority is configured to sign the certificate with a private key. For example, in some embodiments, the certificate authority is configured to deliver the signed certificate to the server hosted website In some embodiments, each of the certificate validators is configured to receive the certificate from the certificate authority. For example, in some embodiments, each of the certificate validators is configured to sign the certificate with a private key. In some embodiments, each of the certificate validators is configured to deliver the signed certificate to the server hosted website.

In some embodiments, the server hosted website is configured to determine that the quantity of valid certificate statuses meets or exceeds the assurance quantity threshold during a TLS handshake. For example, in some embodiments, the server hosted website is configured to establish the HTTPS connection with the client computing device in response to determining that the quantity of valid certificate statuses meets or exceeds the assurance quantity threshold.

In some aspects, a method for establishing a secure connection between a client computing device and a server hosted website includes requesting, by the client computing device, an HTTPS connection with the server hosted website. The method further includes receiving, by the client computing device, a certificate from the server hosted website. The certificate being signed by certificate validators. Further, the method includes, for each of the certificate validators, determining, by the client computing device, a certificate status which indicates whether the certificate is valid or has been revoked. The method also includes determining, by the client computing device, a quantity of valid certificate statuses. The method further includes, in response to determining that the quantity of valid certificate statuses meets or exceeds an assurance quantity threshold, establishing, by the client computing device, the HTTPS connection with the server hosted web site.

In some embodiments, the certificate authority is configured to sign the certificate with a private key. For example, in some embodiments, the certificate authority is configured to deliver the signed certificate to the server hosted website.

In some embodiments, the server hosted website is configured to determine that the quantity of valid certificate statuses meets or exceeds the assurance quantity threshold during a TLS handshake. For example, in some embodiments, the server hosted website is configured to establish the HTTPS connection with the client computing device in response to determining that the quantity of valid certificate statuses meets or exceeds the assurance quantity threshold.

Other aspects and advantages of the invention can become apparent from the following drawings and description, all of which illustrate the principles of the invention, by way of example only.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

DETAILED DESCRIPTION OF THE INVENTION

Figure 1:
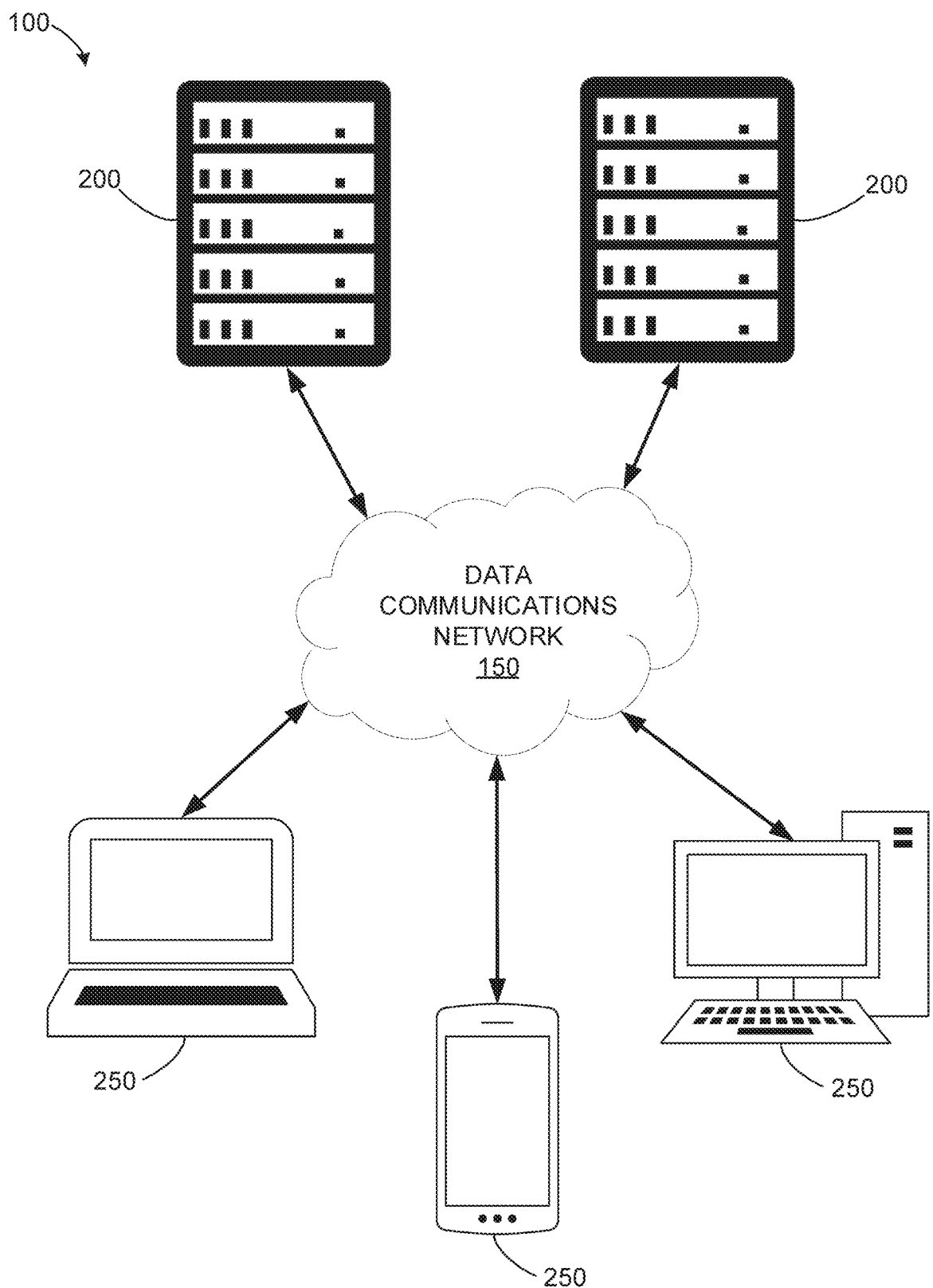
FIG. 1 is a block diagram of an exemplary data communications network, according to embodiments of the technology described herein.

Internet browsers treat all TLS/SSL connections to have the same security assurance level by trusting a single root CA's signature on any given TLS/SSL certificate. However, this approach is inherently unreliable for establishing a secure information exchange channel as CA's can get compromised or go rouge rendering the entire model vulnerable to exploitation. In one aspect, the systems and methods described herein include a logical framework ("HTTPS Plus") for application owners to manage their TLS/SSL certificates and to enforce assurance levels of the connection required to establish a secure channel over the internet. The systems and methods described herein allow web applications to take ownership of the security governance by removing total dependency on the CAs while giving them finer control over their TLS/SSL connection security assurance requirements.

Domain owners have traditionally purchased and installed enhanced TLS/SSL certificates, e.g., Extended Validation ("EV") or Organization Validation ("OV") SSL certificates, to upgrade their TLS security level. However, these certificates just provide slightly varying user experience on the browser to the end user while leaving the security assurance level on server side the same since TLS/SSL protocol essentially treats all connection strength as equal. Even the benefits of having EV SSL certificates for end users are dissipating because browser vendors treat them differently, especially on mobile browsers making the user experience clunky. The issues surrounding issuance of rouge certificates or unauthorized certificate revocation are drawbacks of a centralized CA based PKI.

In order to overcome these shortcomings, the systems and methods described herein provide a layered approach for establishing TLS connections where a centralized authority can be used to bootstrap the certificate issuance process. In some aspects, the certificate management (e.g., updates, revocation) will be a joint responsibility between the certificate issuer and the certificate owner. Additionally, domain owners can configure and assert the assurance level for their TLS connections based on their own needs. Client applications can see additional proof of domain ownership with potentially more than one CA signed certificate to satisfy the minimum assurance level requirements set by the application owner. The systems and methods described herein provide one or more mechanisms or methods where multiple certificate authorities vouch for a domain and the domain owner can set the level of assurance required for a secure connection.

In some aspects, the systems and methods described herein can include one or more mechanisms or methods for establishing a secure connection between a client computing device and a server hosted website. The system and methods described herein can include mechanisms or methods for establishing a secure connection between a client computing device and a server hosted website using a distributed certificate validation model. The systems and methods described herein can include one or more mechanisms or methods for preventing connections between a client computing device and a malicious website. The systems and methods described herein can include one or more mechanisms or methods for creating a layered trust model using entities called Certificate Validator Organizations (CVO) that are designed to provide additional validation and track the status of a given certificate before the client device creates a HTTPS connection with a server hosted website.

Figure 2:
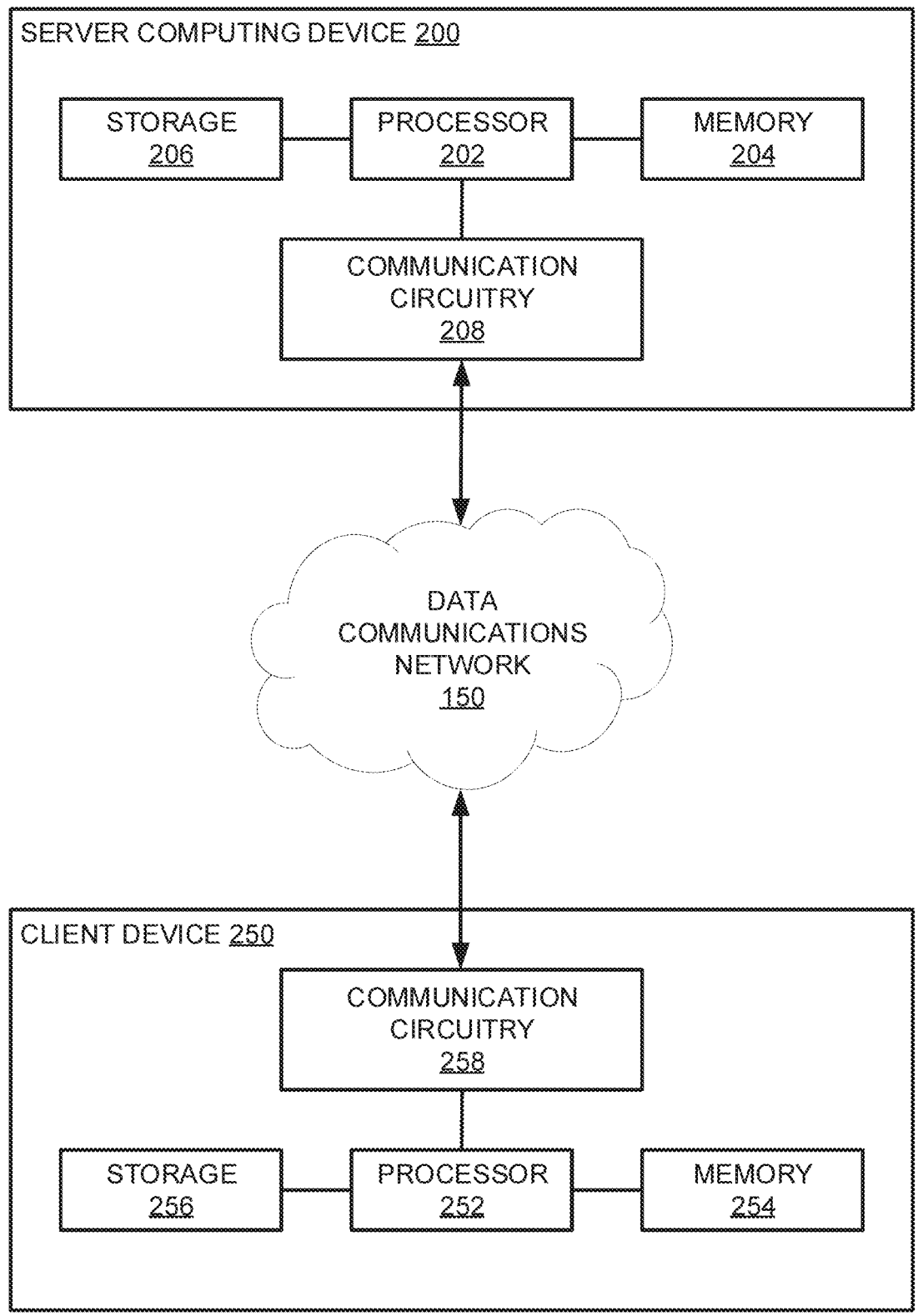
FIG. 2 is a block diagram of an exemplary server computing device and an exemplary client computing device, according to embodiments of the technology described herein.

Referring to FIGS. 1 and 2, an exemplary communications system 100 includes data communications network 150, exemplary server computing devices 200, and exemplary client devices 250. In some embodiments, the system 100 includes one or more server computing devices 200 and one or more client devices 250. Each server computing device 200 can include a processor 202, memory 204, storage 206, and communication circuitry 208. Each client device 250 can include a processor 252, memory 254, storage 256, and communication circuitry 258. In some embodiments, communication circuitry 208 of the server computing devices 200 is communicatively coupled to the communication circuitry 258 of the client devices 250 via data communications network 150. Communication circuitry 208 and communication circuitry 258 can use Bluetooth, Wi-Fi, or any comparable data transfer connection. The client devices 250 can include personal workstations, laptops, tablets, mobile devices, or any other comparable device.

The systems and methods described herein can be implemented using communications system 100. Transmission Layer Security Level of Assurance ("TLS-LoA") is an assertion made by an application owner regarding the assurance level required for a client device 250 to make a secure connection with a website hosted on a server computing device 200. The current TLS/SSL protocol by default equates to a server-side TLS-LoA requirement of 1. This value can be recorded into various assurance service providers for secure storage and retrieval. Once this value is securely associated with the domain name and its public key, client applications will be enforced to verify enough proofs to satisfy this assertion level before making a secure connection. For example, a TLS-LoA of 1 can mean that the server computing device 200 requires a single CA signed certificate as proof of domain ownership, whereas a TLS-LoA of 2 will require the client device 250 to validate a different CA signed certificate (using a different chain of trust) to satisfy the LoA requirement. Additionally, updating the TLS-LoA value can be allowed without requiring any CA involvement giving application owners the ability to change it as they see fit based on their risk requirements.

A domain's TLS-LoA bindings can be bootstrapped on networks that can be used for future retrieval by the client applications. While current DNS infrastructures can support this modification, distributed DNS like systems (e.g. www.handshake.org) and other open source distributed ledger networks are potential entities that can be leveraged to store this binding information for storage and retrieval. Platforms like the Bitcoin blockchain, Ethereum blockchain, or KeyNet can provide an alternative mechanism to store and retrieve the TLS-LoA binding. Since these networks employ some form of consensus protocol (e.g. Proof of Work, Practical Byzantine Fault Tolerance, Federated Byzantine Fault Tolerance), they can reliably store the TLS-LoA record.

The systems and methods described herein can create a TLS-LoA record type which domain owners can update as part of the DNS record. The TLS-LoA record will have a numerical value which can be retrieved by the client device 250 and exchanged with the server computing device 200 as part of the TLS/SSL handshake. For example, in some embodiments, a financial institution can set their TLS-LoA record value to 3, which would require client devices 250 to validate with three different certificate authorities about the authenticity of the domain name and public key binding for establishing a secure connection. In some embodiments, a new resource record type can be obtained and approved by the Internet Assigned Numbers Authority ("IANA").

Figure 3:
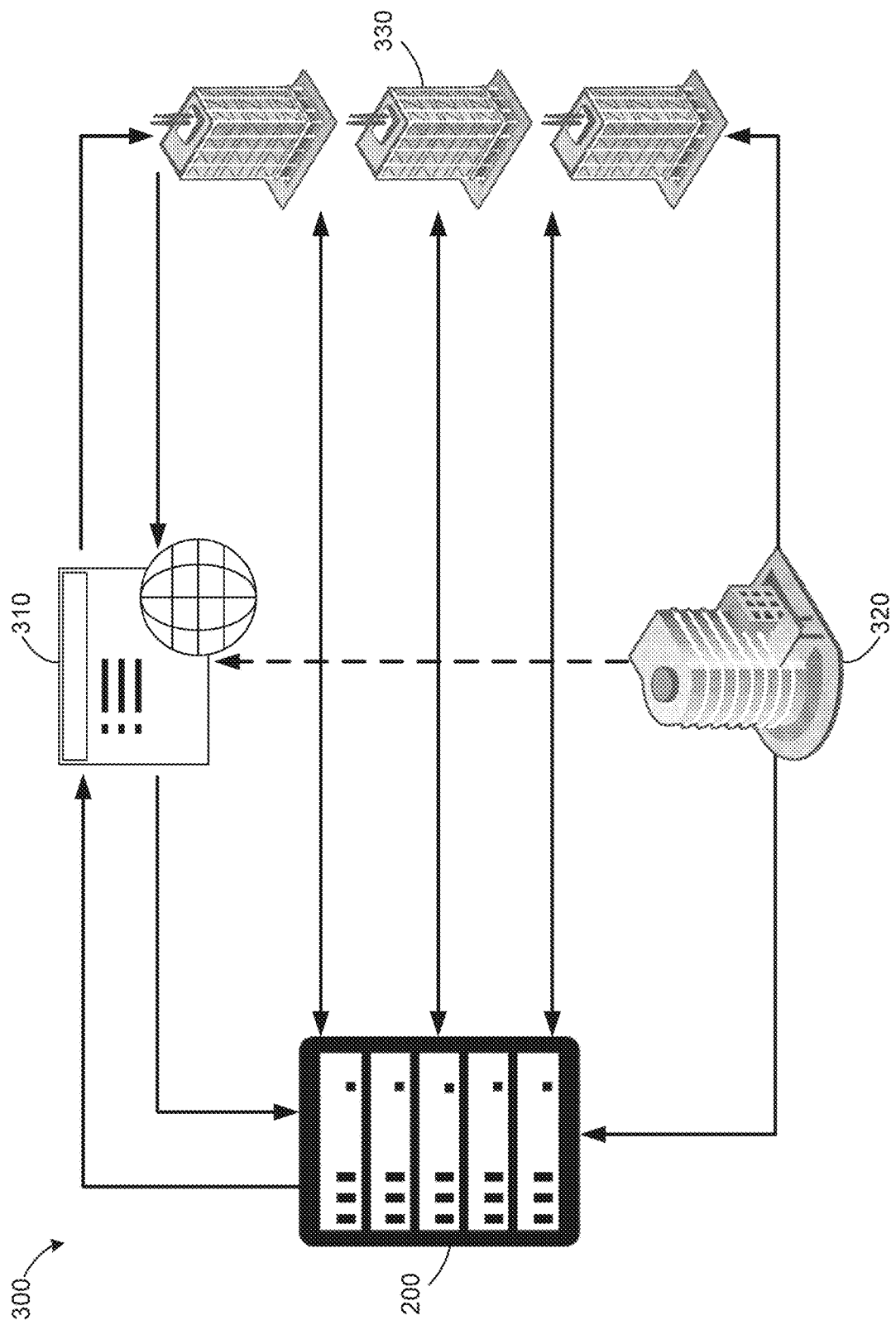
FIG. 3 is a diagram showing a visualization of an exemplary architecture for establishing a secure connection using the exemplary data communications network shown in FIGS. 1 and 2, according to embodiments of the technology described herein.
Figure 4:
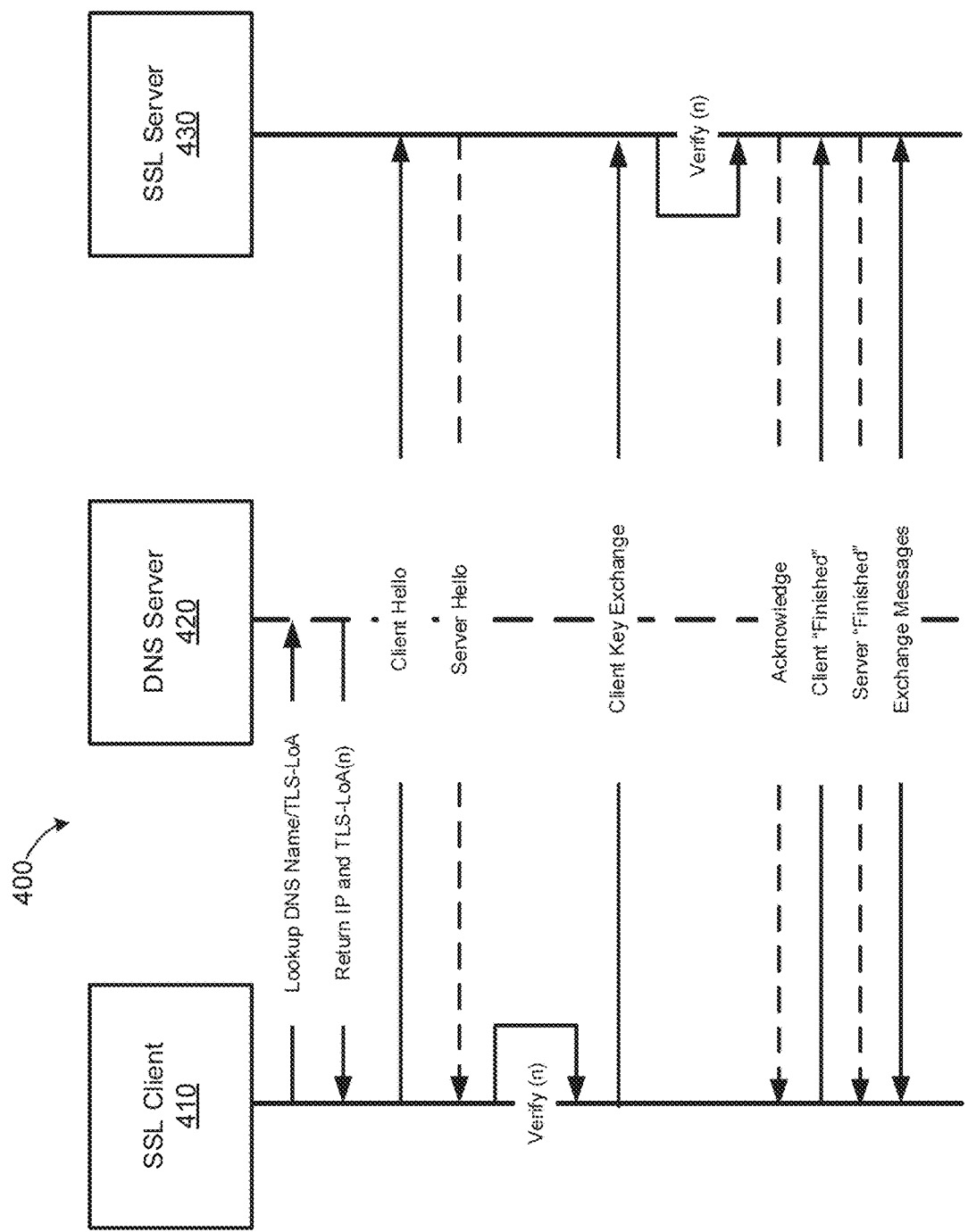
FIG. 4 is a diagram showing a visualization of an exemplary process for establishing a secure connection using the exemplary architecture shown in FIG. 3, according to embodiments of the technology described herein.

Referring to FIGS. 3 and 4, an exemplary architecture 300 and exemplary process 400 for establishing a secure connection between a client device 250 and a website hosted on a server computing device 200 is illustrated, respectively. As shown, the architecture 300 includes a website hosted on a server computing device 200, a browser 310 used by a client device 250, a certificate authority 320, and certificate validator organizations 330. In one aspect, the elements of architecture 300 are configured to establish a secure connection between the client device 250 and the server hosted website. For example, in one embodiment, the website hosted on server computing device 200 is configured to receive a signed certificate from certificate authority 320. The certificate validator organizations 330 are configured to receive the newly issued certificate. Then, the certificate validator organizations 330 are configured to validate the certificate with the server hosted website and sign the certificate with their own private key.

Once signed by the certificate validator organizations 330, the certificate is now in a proper state to be used by the system for establishing a secure connection. For example, in one embodiment, browser 310 on client device 250 is configured to request an HTTPS connection with the website hosted on server computing device 200. Browser 310 can also be configured to receive the signed certificate from the website hosted on server computing device 200. Browser 310 is configured to then establish an HTTPS connection with the certificate validator organizations 330 using a public key. Once established, browser 310 is configured to request the certification status of the signed certificate from each certificate validator organizations 330. The certificate validator organizations 330 are configured to independently check the status of the signed certificate and deliver the status to the browser 310. For example, in some embodiments, the status of the signed certificate can be valid or revoked.

Once browser 310 receives a sufficient number of responses from the certificate validator organizations 330, browser 310 can be configured to determine whether a majority consensus establishes that the signed certificate is valid. For example, browser 310 can be configured to determine that the signed certificate is valid if two or more certificate validator organizations 330 return a valid status. In other embodiments, browser 310 can be configured to determine that the signed certificate is valid if three or more certificate validator organizations 330 return a valid status. If browser 310 receives a sufficient number of valid status responses from the certificate validator organizations 330, browser 310 is configured to initiate a secure connection with the website hosted on server computing device 200. In one embodiment, the server computing device 200 ensures that the browser 310 on client device 250 has met or exceeded the assurance level during the TLS handshake and, upon confirmation, completes the secure HTTPS connection.

FIG. 4 illustrates an exemplary process 400 for establishing a secure connection between a client device 250 and a website hosted on a server computing device 200. In some embodiments, as a prerequisite, domain owners can obtain unique SSL certificates from different CAs for their domain using the traditional CSR process and install them on the server computing device 200. For example, domain owners should have enough number of unique SSL certificates installed on the server that satisfies their TLS-LoA requirement. Process 400 begins with SSL client 410 initiating a DNS lookup and receives the server IP address and domain level TLS-LoA record from the DNS server 420.

Process 400 continues with SSL client 410 sending a "client hello" message to the SSL server 430 that lists cryptographic information such as the TLS/SSL version and, in the client's order of preference, the CipherSuites supported by the client, and the LoA value n. The message also contains a random byte string that is used in subsequent computations. The protocol allows for the client hello to include the data compression methods supported by the client. Process 400 continues with SSL server 430 checking the LoA record and validates the authenticity. The SSL server 430 then responds to the SSL client 410 with a server hello message that contains the CipherSuite chosen by the server from the list provided by the client, the session ID, and another random byte string. In addition, the SSL server 430 also sends its k SSL certificates each of which is signed by different CAs.

Process 400 continues with SSL client 410 verifying n of the k SSL server 430 digital certificates sent to it by the server using the chain of trust. The SSL client 410 then sends the random byte string that enables both the SSL client 410 and the SSL server 430 to compute the secret key to be used for encrypting subsequent message data. A random byte string is chosen on the SSL client 410, encrypted with n public keys, and sent to the SSL server 430. The SSL server 430 decrypts and validates that it has received n copies of the random byte using its n private keys, and acknowledges the TLS-LoA requirement has been satisfied. The SSL client 410 then sends the SSL server 430 a finished message, which is encrypted with the secret key, indicating that the client part of the handshake is complete. The SSL server 430 then sends the SSL client 410 a finished message, which is encrypted with the secret key, indicating that the server part of the handshake is complete. For the duration of the TLS/SSL session, the SSL server 430 and the SSL client 410 can exchange messages that are symmetrically encrypted with the shared secret key. In some embodiments, process 400 can be implemented using a two-way SSL handshake.

Figure 5:
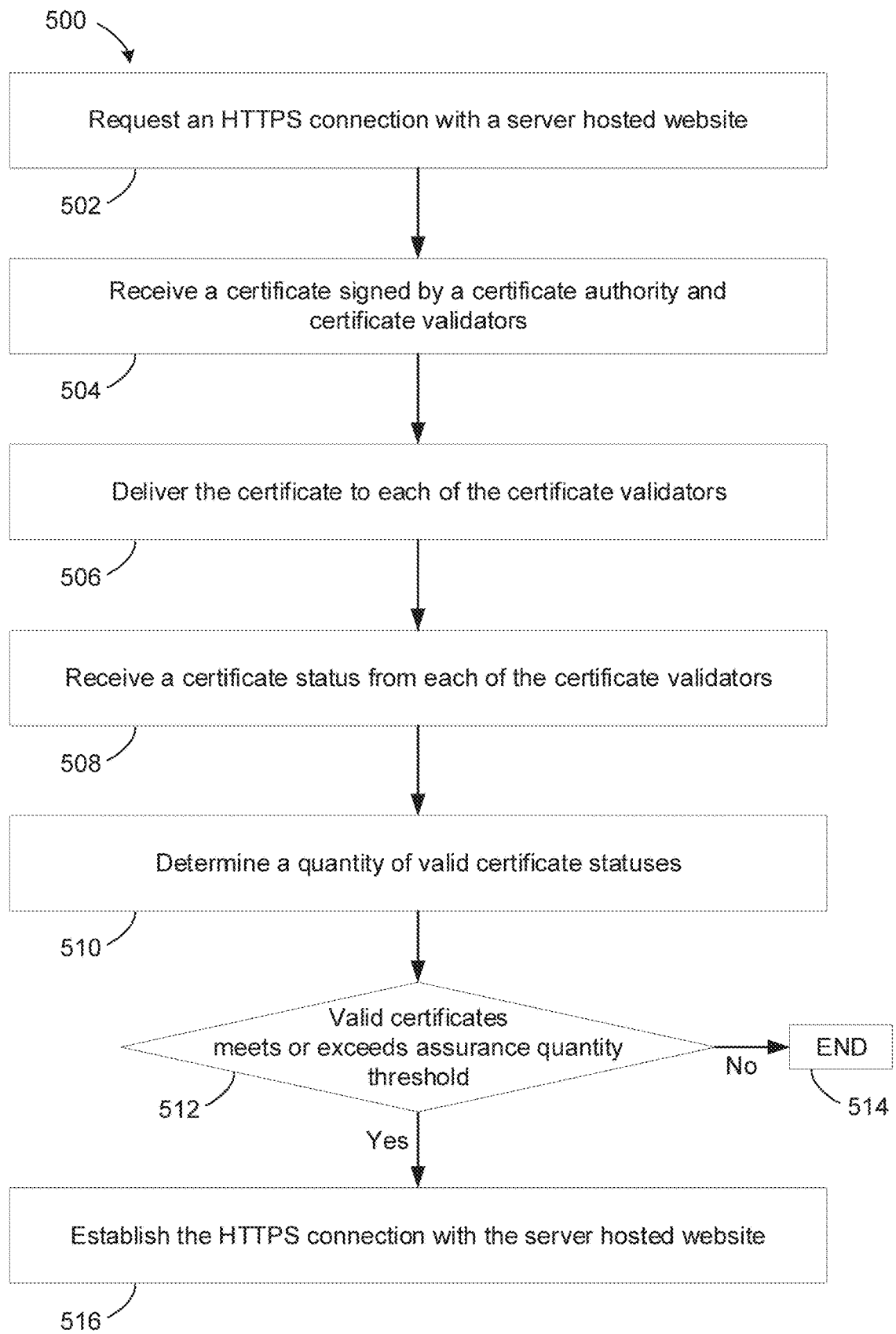
FIG. 5 is a flow diagram of a client-side computer-implemented method for establishing a secure connection using the exemplary architecture shown in FIG. 3, according to embodiments of the technology described herein.

Referring to FIG. 5, a client-side process 500 for establishing a secure connection between a client computing device 250 and a website hosted on a server computing device 200 is illustrated. The process 500 begins by requesting, by the client computing device 250, an HTTPS connection with the server hosted website in step 502. Process 500 continues by receiving, by the client computing device 250, a certificate from the server hosted website in step 504. For example, in some embodiments, the certificate is signed by a certificate authority 320 and certificate validators 330. In some embodiments, the certificate authority 320 is configured to sign the certificate with a private key. In some embodiments, the certificate authority 320 is configured to deliver the signed certificate to the server hosted website. In some embodiments, each of the certificate validators 330 is configured to receive the certificate from the certificate authority 320. In some embodiments, each of the certificate validators 330 is configured to sign the certificate with a private key. In some embodiments, each of the certificate validators 330 is configured to deliver the signed certificate to the server hosted website.

Process 500 continues by delivering, by the client computing device 250, the certificate to each of the certificate validators 330 in step 506. Process 500 continues by, for each of the certificate validators 330, receiving, by the server hosted website, a certificate status which indicates whether the certificate is valid or has been revoked in step 508. Process 500 continues by determining, by the client computing device 250, a quantity of valid certificate statuses received from the certificate validators 330 in step 510. Process 500 continues by determining, by the client computing device 250, whether the quantity of valid certificate statuses meets or exceeds an assurance quantity threshold in step 512.

For example, as discussed in relation to FIGS. 3 and 4, the assurance quantity threshold is based on a desired security level of the server hosted website. In some embodiments, the assurance quantity threshold comprises two or more valid certificate statuses. In other embodiments, the assurance quantity threshold comprises three or more valid certificate statuses. If the client computing device 250 determines that the quantity of valid certificate statuses does not meet or exceed the assurance quantity threshold, process 500 continues to end the attempted connection in step 514. Otherwise, if the client computing device 250 determines that the quantity of valid certificates does meet or exceed the assurance quantity threshold, process 500 finishes by establishing, by the client computing device 250, the HTTPS connection with the server hosted website in step 516.

Figure 6:
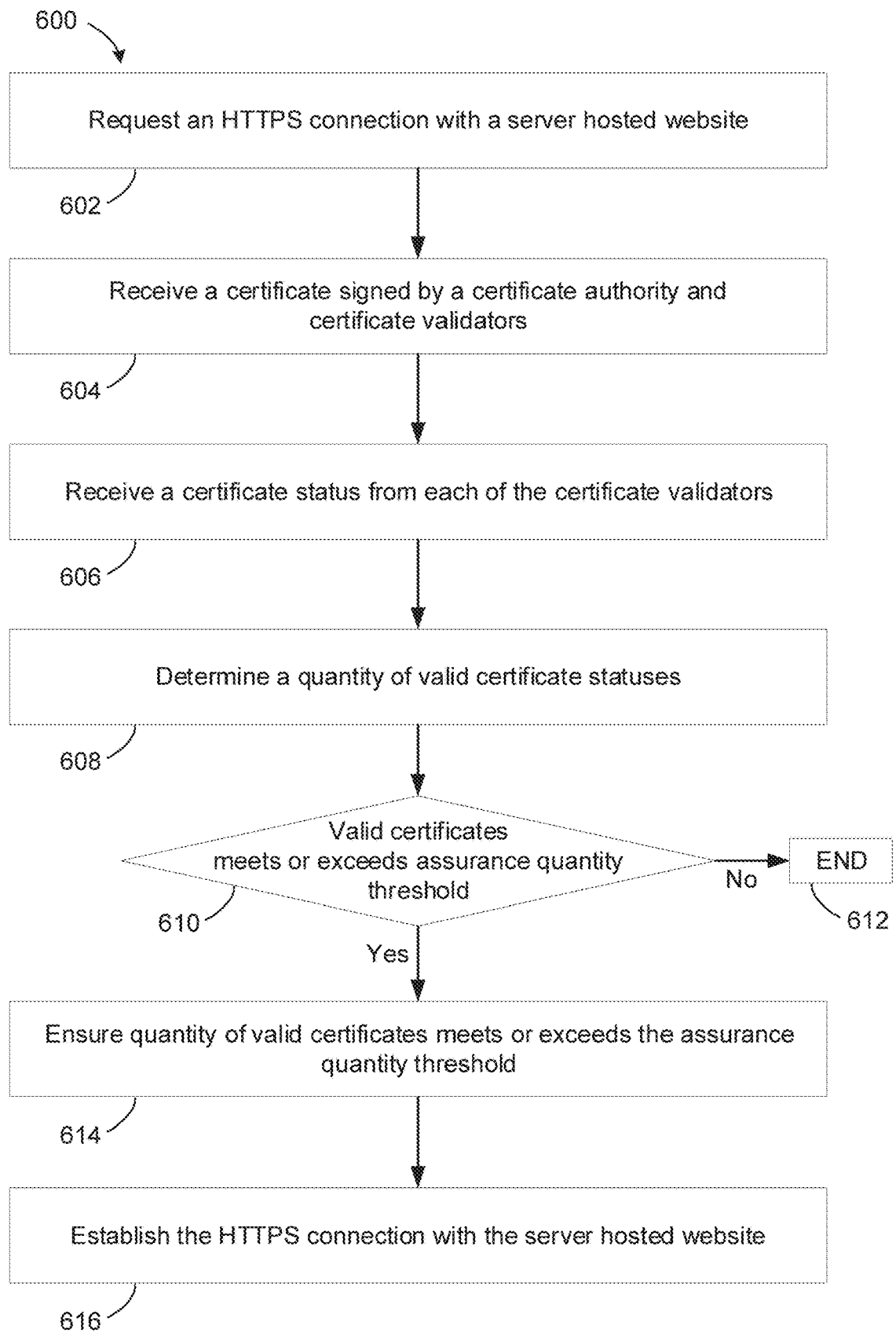
FIG. 6 is a flow diagram of a server-side computer-implemented method for establishing a secure connection using the exemplary architecture shown in FIG. 3, according to embodiments of the technology described herein.

Referring to FIG. 6, a server-side process 600 for establishing a secure connection between a client computing device 250 and a website hosted on a server computing device 200 is illustrated. The process 600 begins by requesting, by the client computing device 250, an HTTPS connection with the server hosted website in step 602. Process 600 continues by receiving, by the client computing device 250, a certificate from the server hosted website in step 604. For example, in some embodiments, the certificate is signed by a certificate authority 320 and certificate validators 330. In some embodiments, the server hosted website sends the certificate to the client computing device 250. In some embodiments, the certificate authority 320 is configured to sign the certificate with a private key. In some embodiments, the certificate authority 320 is configured to deliver the signed certificate to the server hosted website. In some embodiments, each of the certificate validators 330 is configured to receive the certificate from the certificate authority 320. In some embodiments, each of the certificate validators 330 is configured to sign the certificate with a private key. In some embodiments, each of the certificate validators 330 is configured to deliver the signed certificate to the server hosted website.

Process 600 continues by, for each of the certificate validators 330, determining, by the client computing device 250, a certificate status which indicates whether the certificate is valid or has been revoked in step 606. Process 600 continues by determining, by the client computing device 250, a quantity of valid certificate statuses based on the determined certificate statuses for each of the certificate validators 330 in step 608. Process 600 continues by determining, by the client computing device 250, whether the quantity of valid certificate statuses meets or exceeds an assurance quantity threshold in step 610.

For example, as discussed in relation to FIGS. 3 and 4, the assurance quantity threshold is based on a desired security level of the server hosted website. In some embodiments, the assurance quantity threshold comprises two or more valid certificate statuses. In other embodiments, the assurance quantity threshold comprises three or more valid certificate statuses. If the client computing device 250 determines that the quantity of valid certificate statuses does not meet or exceed the assurance quantity threshold, process 600 continues to end the attempted connection in step 612. Otherwise, if the client computing device 250 determines that the quantity of valid certificates does meet or exceed the assurance quantity threshold, process 600 continues by determining, by the website hosted on the server computing device 200, that the quantity of valid certificate statuses meets or exceeds the assurance quantity threshold during the TLS handshake in step 614. Process 600 finishes by establishing the HTTPS connection between the client computing device 250 and the website hosted on the server computing device 200 in step 616.

In some aspects, the above-described techniques can be implemented on a system for establishing a secure connection between a client computing device 250 and a server hosted website. The system includes a client computing device 250 communicatively coupled to a certificate authority 320 and certificate validators 330. The client computing device 250 is configured to request an HTTPS connection with a website hosted on a server computing device 200. The client computing device 250 is also configured to receive a certificate from the server hosted website. The certificate is signed by the certificate authority 320 and the certificate validators 330. Further, the client computing device 250 is configured to validate the certificate from each of the certificate validators 330 using a pre-installed root CA certificate. The client computing device 250 is also configured to, for each of the certificate validators 330, determine a certificate status which indicates whether the certificate is valid or has been revoked. Further, the client computing device 250 is configured to determine a quantity of valid certificate statuses validated from the certificate validators 330. The client computing device 250 is also configured to, in response to determining that the quantity of valid certificate statuses meets or exceeds an assurance quantity threshold, establish the HTTPS connection with the server hosted website.

The systems and methods described herein address the concerns related to current TLS/SSL protocols. The modern day TLS/SSL protocol is not secure and can be compromised if the CA signing a website certificate is compromised. TLS-LoA eliminates the reliance on a single certificate authority 320 and gives domain owners flexibility to set the assurance level. In one aspect, TLS-LoA can be set by individual domain owners, performed by a client device 250, and enforced by a server computing device 200. In some embodiments, TLS-LoA can be an extension to the current TLS protocol, and is compatible with current browser infrastructure. For example, the absence of TLS-LoA for a domain defaults to a TLS-LoA of 1 which equates to the current TLS environment. Overall, The slight overhead incurred because of multi-certificate chain validation on the client side and server side is compensated for the higher level of assurance for the SSL connections for organizations. In some embodiments, because the server computing device 200 is responsible for enforcing the TLS-LoA requirements, sole reliance on the client device 250 for accepting the server certificate chain is removed. In other embodiments, the certificate chain can be validated at the certificate authority 320.

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites. The computer program can be deployed in a cloud computing environment (e.g., Amazon® AWS, Microsoft® Azure, IBM®).

Method steps can be performed by one or more processors executing a computer program to perform functions of the invention by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit), or the like. Subroutines can refer to portions of the stored computer program and/or the processor, and/or the special circuitry that implement one or more functions.

Processors suitable for the execution of a computer program include, by way of example, special purpose microprocessors specifically programmed with instructions executable to perform the methods described herein, and any one or more processors of any kind of digital or analog computer. Generally, a processor receives instructions and data from a read-only memory or a random access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computing device in communication with a display device, e.g., a CRT (cathode ray tube), plasma, or LCD (liquid crystal display) monitor, a mobile device display or screen, a holographic device and/or projector, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above-described techniques can be implemented in a distributed computing system that includes a back-end component. The back-end component can, for example, be a data server, a middleware component, and/or an application server. The above described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above described techniques can be implemented in a distributed computing system that includes any combination of such back-end, middleware, or front-end components.

The components of the computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), Bluetooth, near field communications (NFC) network, Wi-Fi, WiMAX, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), and/or other circuit-based networks.

Information transfer over transmission medium can be based on one or more communication protocols. Communication protocols can include, for example, Ethernet protocol, Internet Protocol (IP), Voice over IP (VOIP), a Peer-to-Peer (P2P) protocol, Hypertext Transfer Protocol (HTTP), Session Initiation Protocol (SIP), H.323, Media Gateway Control Protocol (MGCP), Signaling System #7 (SS7), a Global System for Mobile Communications (GSM) protocol, a Push-to-Talk (PTT) protocol, a PTT over Cellular (POC) protocol, Universal Mobile Telecommunications System (UMTS), 3GPP Long Term Evolution (LTE) and/or other communication protocols.

Devices of the computing system can include, for example, a computer, a computer with a browser device, a telephone, an IP phone, a mobile device (e.g., cellular phone, personal digital assistant (PDA) device, smart phone, tablet, laptop computer, electronic mail device), and/or other communication devices. The browser device includes, for example, a computer (e.g., desktop computer and/or laptop computer) with a World Wide Web browser (e.g., Chrome™ from Google, Inc., Microsoft® Internet Explorer® available from Microsoft Corporation, and/or Mozilla® Firefox available from Mozilla Corporation). Mobile computing device include, for example, a Blackberry® from Research in Motion, an iPhone® from Apple Corporation, and/or an Android™-based device. IP phones include, for example, a Cisco® Unified IP Phone 7985G and/or a Cisco® Unified Wireless Phone 7920 available from Cisco Systems, Inc.

Comprise, include, and/or plural forms of each are open ended and include the listed parts and can include additional parts that are not listed. And/or is open ended and includes one or more of the listed parts and combinations of the listed parts.

One skilled in the art will realize the subject matter may be embodied in other specific forms without departing from the spirit or essential characteristics thereof. The foregoing embodiments are therefore to be considered in all respects illustrative rather than limiting of the subject matter described herein.

What is claimed:

1. A method for establishing a secure connection between a client computing device and a server hosted website, the method comprising:

requesting, by a client computing device, an HTTPS connection with a server hosted website;

receiving, by the client computing device, a certificate from the server hosted website, wherein the certificate is signed by a certificate authority and a plurality of certificate validators;

delivering, by the client computing device, the certificate to each of the plurality of certificate validators;

for each of the plurality of certificate validators, receiving, by the server hosted website, a certificate status of a plurality of certificate statuses, wherein each certificate status indicates whether the certificate is valid or has been revoked;

determining, by the server hosted website, a quantity of valid certificate statuses received from the plurality of certificate validators; and in response to determining that the quantity of valid certificate statuses meets or exceeds an assurance quantity threshold, establishing, by the client computing device, the HTTPS connection with the server hosted website.

2. The method of claim 1, wherein the certificate authority is configured to sign the certificate with a private key.

3. The method of claim 2, wherein the certificate authority is configured to deliver the signed certificate to the server hosted website.

4. The method of claim 1, wherein each of the certificate validators is configured to receive the certificate from the certificate authority.

5. The method of claim 4, wherein each of the certificate validators is configured to sign the certificate with a private key.

6. The method of claim 5, wherein each of the certificate validators is configured to deliver the signed certificate to the server hosted website.

7. The method of claim 1, wherein the assurance quantity threshold comprises two or more valid certificate statuses.

8. The method of claim 1, wherein the assurance quantity threshold is based on a desired security level of the server hosted website.

9. A system for establishing a secure connection between a client computing device and a server hosted website, the system comprising:

a client computing device communicatively coupled to a certificate authority and a plurality of certificate validators, the client computing device configured to:

request an HTTPS connection with a server hosted website;

receive a certificate from the server hosted website, wherein the certificate is signed by the certificate authority and the plurality of certificate validators;

validate the certificate from each of the plurality of certificate validators using a pre-installed root CA certificate;

for each of the plurality of certificate validators, determine a certificate status of a plurality of certificate statuses, wherein each certificate status indicates whether the certificate is valid or has been revoked;

determine a quantity of valid certificate statuses validated from the plurality of certificate validators; and in response to determining that the quantity of valid certificate statuses meets or exceeds an assurance quantity threshold, establish the HTTPS connection with the server hosted website.

10. The system of claim 9, wherein the certificate authority is configured to sign the certificate with a private key.

11. The system of claim 10, wherein the certificate authority is configured to deliver the signed certificate to the server hosted website.

12. The system of claim 9, wherein each of the certificate validators is configured to receive the certificate from the certificate authority.

13. The system of claim 12, wherein each of the certificate validators is configured to sign the certificate with a private key.

14. The system of claim 13, wherein each of the certificate validators is configured to deliver the signed certificate to the server hosted website.

15. The system of claim 9, wherein the server hosted website is configured to determine that the quantity of valid certificate statuses meets or exceeds the assurance quantity threshold during a TLS handshake.

16. The system of claim 15, wherein the server hosted website is configured to establish the HTTPS connection with the client computing device in response to determining that the quantity of valid certificate statuses meets or exceeds the assurance quantity threshold.

17. A method for establishing a secure connection between a client computing device and a server hosted website, the method comprising:

requesting, by a client computing device, an HTTPS connection with a server hosted website;

receiving, by the client computing device, a certificate from the server hosted website, wherein the certificate is signed by a plurality of certificate validators;

for each of the plurality of certificate validators, determining, by the client computing device, a certificate status of a plurality of certificate statuses, wherein each certificate status indicates whether the certificate is valid or has been revoked;

determining, by the client computing device, a quantity of valid certificate statuses based on the plurality of certificate statuses; and in response to determining that the quantity of valid certificate statuses meets or exceeds an assurance quantity threshold, establishing, by the client computing device, the HTTPS connection with the server hosted website.

18. The method of claim 17, wherein each certificate authority is configured to sign the certificate with a private key.

19. The method of claim 18, wherein each certificate authority is configured to deliver the signed certificate to the server hosted website.

20. The method of claim 17, wherein the server hosted website is configured to determine that the quantity of valid certificate statuses meets or exceeds the assurance quantity threshold during a TLS handshake.

\* \* \* \* \*